United States Patent [19]

Koch

[11] 3,726,935

[45] Apr. 10, 1973

[54] PREPARATION OF 1,6,8-DECATRIENE

[75] Inventor: Theodore Augur Koch, Wilmington, Del.

[73] Assignee: E. I. du Pont de Nemours and Company, Wilmington, Del.

[22] Filed: May 5, 1972

[21] Appl. No.: 250,498

[52] U.S. Cl. ............................260/677 R, 260/683.2
[51] Int. Cl. ..................................................C07c 5/22
[58] Field of Search ..............260/677, 680 R, 666 B, 260/683.2

[56] References Cited

UNITED STATES PATENTS

| | | | |
|---|---|---|---|
| 3,579,606 | 5/1971 | Umbach | 260/677 |
| 3,376,359 | 4/1968 | Schneider | 260/677 R |
| 3,376,358 | 4/1968 | Schneider | 260/677 R |
| 3,546,312 | 12/1970 | Heckelsberg et al. | 260/683 R |
| 3,449,463 | 6/1969 | Kenton et al. | 260/677 |
| 3,546,310 | 12/1970 | Cardenas | 260/677 |

FOREIGN PATENTS OR APPLICATIONS

| | | | |
|---|---|---|---|
| 1,226,095 | 10/1966 | Germany | 260/677 |
| 1,443,465 | 11/1968 | Germany | 260/677 |

*Primary Examiner*—Delbert E. Gantz
*Assistant Examiner*—J. Nelson
*Attorney*—Alanson G. Bowen, Jr.

[57] ABSTRACT

A method for preparing 1,6,8-decatriene by contacting 1,4,9-decatriene, in the vapor phase and in the absence of oxygen, with an alumina catalyst. Preferred catalysts are promoted with an alkali metal salt.

8 Claims, No Drawings

3,726,935

PREPARATION OF 1,6,8-DECATRIENE

BACKGROUND OF THE INVENTION

This invention pertains to the selective isomerization of 1,4,9-decatriene to 1,6,8-decatriene.

Amorphous dipolymers of ethylene and propylene are well known in the art to possess elastomeric properties. These dipolymers will undergo peroxide curing but are limited in that they will not undergo other types of curing, such as sulfur curing which is preferred by the rubber industry.

The art has overcome this problem by copolymerizing a polyunsaturated monomer, such as a diene or triene, with ethylene and propylene. Preferred polyunsaturated monomers have a double bond which readily copolymerizes with ethylene and propylene, and at least one double bond which does not enter the polymerization reaction. Resulting copolymers have saturated backbones with pendant unsaturation available as curing sites.

The compound 1,4,9-decatriene has been suggested as a useful third monomer in preparing sulfur-vulcanizable copolymers of ethylene and propylene. This compound has two terminal double bonds, both of which copolymerize with ethylene and propylene. The resulting polymer has a gel content higher than desired, making processing difficult, and has fewer cure sites than if only one double bond entered the copolymerization reaction.

Selection of 1,6,8-decatriene as a third monomer in ethylene-propylene copolymerization avoids the disadvantage posed by 1,4,9-decatriene, its isomer. The compound 1,6,8-decatriene has one terminal bond which enters the copolymerization reaction and two internal double bonds which are not copolymerized. The latter double bonds are available as copolymer curing sites.

SUMMARY OF THE INVENTION

In accordance with this invention 1,4,9-decatriene is selectively isomerized to 1,6,8-decatriene by contact, in the vapor phase and in the absence of oxygen, with an alumina catalyst. The preferred catalyst is a non-acidic or alkali metal salt promoted alumina.

DESCRIPTION OF THE PREFERRED EMBODIMENTS

The compound 1,4,9-decatriene, which is selectively isomerized by the process of this invention, is conveniently prepared by reacting butadiene, or an alkyl substituted butadiene such as isoprene, with ethylene using the process of U.S. Pat. Nos. 3,376,358 or 3,376,359. It is understood that the term 1,4,9-decatriene, as used herein, includes alkyl substituted 1,4,9-decatriene such as dimethyl-1,4,9-decatriene which is formed when isoprene is the selected starting material.

In practicing this invention 1,4,9-decatriene is contacted, in the vapor phase, with an alumina catalyst. The starting compound 1,4,9-decatriene is a liquid at ambient temperatures and is conveniently vaporized in a separate chamber shortly prior to the isomerization reaction.

Isomerization is conducted in a flow reactor containing the alumina catalyst. Prior to the introduction of 1,4,9-decatriene the reaction vessel is purged with a non-reactive gas, such as nitrogen, to remove oxygen. Oxygen is excluded during the course of the isomerization reaction. Conveniently, isomerization is conducted at atmospheric pressure in the presence of a non-reactive diluent such as nitrogen. Higher or lower pressures can be selected, however, and use of a non-reactive diluent is not essential.

The reaction is conducted at a temperature above about 175°C. to maintain 1,4,9-decatriene and the 1,6,8-decatriene isomerization product in the vapor phase. The reaction is generally conducted at a temperature lower than 300°C. since competing cracking reactions reduce yields at higher temperatures. A preferred temperature range is about 200° to 250°C., with lower temperatures within this range being especially perferred. Temperatures of about 200°C. will give especially good conversion rates with low catalyst deterioration.

While any alumina may be selected as the isomerization catalyst, commercial alumina is generally acidic and produces lower yields than non-acidic alumina, or alumina promoted with sodium, potassium, lithium, or cesium salts. The preferred alkali metal salt promoted alumina catalysts will contain less than about 1 percent, and preferably about 0.2 to 0.5 percent, by weight of promoter. Promoted catalysts preferred in practicing this invention are prepared using standard techniques. For example, the alumina can be coated with the promoter in carbonate, bicarbonate, or hydroxide solution followed by drying.

Conversions of about 58 percent, with 96 percent yield, have been obtained in isomerizing 1,4,9-decatriene to 1,6,8-decatriene using the preferred promoted alumina catalysts.

The 1,6,8-decatriene is useful as a comonomer in the copolymerization of ethylene and propylene. This triene has internal conjugated unsaturation which does not enter copolymerization. Resulting ethylene/propylene/1,6,8-decatriene terpolymers have pendant conjugated unsaturation available for sulfur, Diels-alder, or resin curing.

In the examples that follow all percentages are proportional to weight unless otherwise indicated.

EXAMPLE I

Preparation of 1,6,8-Decatriene using Alumina Catalysts

A. Isomerization Apparatus

The isomerization apparatus consists of a 25 mm. o.d. glass tube mounted vertically and defined into two sections by 8-inch tube furnaces. The tube in the upper furnace is used as a preheater, and the tube in the lower furnace contains the catalyst. The tube in the preheater is packed with quartz or silicon carbide chips to ensure vaporization of the feed material.

B. Preparation of 1,6,8-Decatriene

Twenty cc. of the catalysts listed in Table 1 are placed in the reaction furnace of the previously described apparatus in individual runs. The reaction temperature is 175°C. Thirty cc. of 1,4,9-decatriene per hour is fed to the isomerization apparatus and the effluent analyzed at various times by gas chromatography on a 10 percent SE 30 (silicon oil) on 70–80 mesh ABS (acid/base washed and silanized) column. The products are identified by comparison of the gas chromatographic retention times with those of authentic samples. The 1,6,8-decatriene is also isolated by distillation and its structure verified by infrared and nuclear magnetic resonance spectroscopy.

TABLE 1

| Type of Alumina | Time from beginning of Run (min) | 1,4,9-Deca-triene (%) | 1,6,8-Deca-triene (%) | Unknown (%) | Octa-octa-diene (%) |
|---|---|---|---|---|---|
| Grace eta[1] | 210 | 51 | 49 | | |
| | 490 | 73 | 27 | | |
| Kaiser XA-757[2] | 195 | 49 | 44 | 7 | |
| | 555 | 68 | 31 | 1 | |
| Kaiser KA-161[3] | 30 | 35 | 63 | 2 | 0 |
| | 285 | 42 | 45 | 8 | 5 |

[1]powder form, 95% eta alumina, 5% gamma alumina
[2]ball form, low sodium (0.02% Na$_2$O) alumina
[3]essentially the same as Kaiser XA-757

The above table shows that conversion decreases with time when using an untreated alumina catalyst.

EXAMPLE II

Preparation of 1,6,8-Decatriene using Promoted Alumina Catalyst

The catalyst is prepared by steeping 75 cc. of Kaiser KA-302 alumina for 30 min. in a solution of 0.3 gram Na$_2$CO$_3$ in 100 cc. water. The mixture is drained, air dried, and then dried at 200°C. under a nitrogen flow. Twenty cc of the catalyst is charged to the isomerization apparatus described in Example I. A similar run is conducted with untreated catalyst.

Isomerization is conducted at 175° to 300°C. The products are analyzed as described in Example I. Results are given in Table II.

TABLE II

| | Time from beginning of Run | 1,4,9-Deca-triene (%) | 1,6,8-Deca-triene (%) | Feed Rate (LHVS)[2] |
|---|---|---|---|---|
| Treated Alumina Kaiser KA-302[1] | 330 min. | 36 | 56[3] | 1.5 |
| | 720 min. | 38 | 62 | 1.5 |
| | 2 days | 37 | 63 | 1.5 |
| | 8 days | 42 | 58 | 1.5 |
| Untreated Alumina Kaiser KA-302[1] | 450 min. | 44 | 56 | 2 |
| | 600 min. | 57 | 43 | 1 |

[1]Ball form; 93.6% Al, 6.0% loss on ignition, balance SiO$_2$, Fe$_2$O$_3$, TiO$_2$, and Na$_2$O; 380 sq. meters per gram.
[2]Liquid hourly space velocity, pounds as liquid per hour.
[3]8% material of unknown structure.

The table of Example II shows that promoted catalyst gives continuing good conversions after 8 days, whereas conversion achieved with unpromoted catalyst had significantly decreased after 10 hours.

I claim:

1. A method for preparing 1,6,8-decatriene consisting essentially of contacting 1,4,9-decatriene, in the vapor phase and in the absence of oxygen, with an alumina catalyst.

2. The method of claim 1 wherein the alumina catalyst is a non-acidic alumina.

3. The method of claim 1 wherein the alumina catalyst is promoted with at least one alkali metal salt.

4. The method of claim 3 wherein the temperature is at least 175°C.

5. The method of claim 4 wherein the temperature is about 200° to 250°C.

6. The method of claim 5 wherein the promoter is present in an amount up to about 1 percent by weight of the alumina.

7. The method of claim 6 wherein the promoter is present in the amount of about 0.2 to 0.5 percent by weight of the alumina.

8. The method of claim 7 wherein the promoter is a sodium salt.

* * * * *